United States Patent

Kern et al.

[11] Patent Number: 5,728,187
[45] Date of Patent: Mar. 17, 1998

[54] AIR FILTRATION MEDIA

[75] Inventors: Charles F. Kern, Marietta, Ohio; Michael John Cusick, Englewood; Jack E. Wilhelm, Littleton, both of Colo.

[73] Assignee: Schuller International, Inc., Denver, Colo.

[21] Appl. No.: 602,430

[22] Filed: Feb. 16, 1996

[51] Int. Cl.⁶ ........................................ B01D 39/20
[52] U.S. Cl. .......................... 55/486; 55/524; 55/527; 210/491; 210/509; 428/198; 428/219; 428/220; 428/340; 442/76; 442/180
[58] Field of Search ...................... 428/219, 220, 428/198, 360, 288, 340, 285, 426; 55/486, 487, 524, 527, 528; 210/488, 491, 506, 508, 509; 442/76, 180, 161, 164

[56] References Cited

U.S. PATENT DOCUMENTS

| | | | |
|---|---|---|---|
| 3,023,839 | 3/1962 | Best | 55/524 |
| 3,690,852 | 9/1972 | Smith et al. | 55/485 |
| 4,637,951 | 1/1987 | Gill et al. | 428/219 |
| 4,650,506 | 3/1987 | Barris et al. | 55/487 |
| 4,728,349 | 3/1988 | Oshitari | 55/487 |
| 4,877,433 | 10/1989 | Oshitari | 55/486 |
| 5,045,094 | 9/1991 | Paranjpe | 55/524 |
| 5,288,402 | 2/1994 | Yoshida | 55/524 |
| 5,318,831 | 6/1994 | Hirama et al. | 55/527 |
| 5,342,424 | 8/1994 | Pfeffer | 428/288 |
| 5,389,121 | 2/1995 | Pfeffer | 428/288 |
| 5,472,467 | 12/1995 | Pfeffer | 55/527 |
| 5,588,976 | 12/1996 | Miller | 55/527 |
| 5,634,954 | 6/1997 | Kern | 55/527 |

FOREIGN PATENT DOCUMENTS

| 60-58221 | 4/1985 | Japan | 55/524 |
|---|---|---|---|

*Primary Examiner*—Duane S. Smith
*Attorney, Agent, or Firm*—Cornelius P. Quinn

[57] ABSTRACT

An air filtration media is formed of a blanket of fibers, preferably glass fibers, bonded together at their points of intersection with a binder. The blanket has a weight between about 2.5 and about 4.0 grams per square foot and the average diameter of the fibers in the blanket is within a range from $3.0 \times 10^{-5}$ to $4.1 \times 10^{-5}$ inches. The blanket has an average air filtration efficiency of at least 80% and the pressure drop across the thickness of the blanket is no greater than 0.30 inches of water. The blanket can be used alone; with a permeable backing sheet; or with a second layer or blanket of filtration media, as part of a dual-phase or multi-phase air filtration media.

23 Claims, 1 Drawing Sheet

AIR FILTRATION MEDIA

BACKGROUND OF THE INVENTION

The present invention relates to an air filtration media and, in particular, to a new, light weight air filtration media which performs at air filtration efficiencies, comparable with the efficiencies of previous air filtration media, at greatly reduced weights and greatly reduced pressure drops across the air filtration media.

Heating, ventilating and air conditioning systems used in commercial and industrial buildings and similar buildings or structures are provided with air filtration units using sock, bag, pleated or other conventional filters to clean the air being circulated throughout the buildings or structures. Typically, the air filtration media, used in these filtration units, is a single phase filtration media, used in these filtration units, is a single phase filtration media comprising a high efficiency, fibrous blanket reinforced on its downstream surface with a permeable backing sheet. This type of air filtration media is relatively inexpensive and since the air filtration media is changed frequently in most applications, the dust holding capacity of the single phase air filtration media is adequate.

However, where increased dust holding capacity is required for certain applications, a dual phase air filtration media can also be used for this type of air filtration. A dual phase air filtration media includes a laminate of two fibrous blankets and typically, a permeable backing sheet. Preferably, the upstream blanket or layer of the laminate is a relatively low efficiency filtration media formed of relatively coarse fibers. This low efficiency filtration media functions to remove coarse dust particles from the air stream and to increase the dust holding capacity of the dual phase filter. Preferably, the downstream blanket or layer of the laminate is a high efficiency filtration media formed of relatively fine fibers, such as the air filtration media used in the single phase filtration media referred to above, and functions to increase the efficiency of the dual phase filtration media. The permeable backing sheet functions solely to increase the integrity of the dual phase filtration media.

High efficiency filtration media, such as the AFS-4 and AFS-3 filtration media, of Schuller International, Inc., are examples of the single phase, high efficiency filtration media referred to above. The AFS-4 filtration media is formed of flame attenuated glass fibers having an average fiber diameter between about $4.2 \times 10^{-5}$ and about $6.0 \times 10^{-5}$ inches; weights between about 5.5 and about 7.0 grams per square foot; is approximately 0.23 to 0.33 inches thick; has a dust holding capacity of about 12 grams; has a nominal initial pressure drop of 0.17 inches of water; and has an average air filtration efficiency between 80% and 85%. The AFS-3 filtration media is formed of flame attenuated glass fibers having an average fiber diameter between about $3.8 \times 10^{-5}$ and about $5.0 \times 10^{-5}$ inches; weights between about 5.9 and about 7.5 grams per square foot; is approximately 0.23 to 0.33 inches thick; has a dust holding capacity of about 10 grams; has a nominal initial pressure drop of 0.32 inches of water; and has an average air filtration efficiency between 90% and 95%.

SUMMARY OF THE INVENTION

The present invention relates to new, light weight, high efficiency, air filtration media which although weighing significantly less than the AFS-4 and AFS-3 filtration media and being considerably thinner than the AFS-4 and AFS-3 filtration media, have comparable efficiencies and dust holding capacities at much lower pressure drops across the air filtration media. The weight reduction provided by the new air filtration media, about one third or more, results in a significant cost savings in the production of the air filtration media. However, the lower operating costs associated with the new air filtration media should be of even greater interest to the user. The new air filtration media, when compared with samples of the AFS-4 and AFS-3 air filtration media, exhibited initial pressure drops across the air filtration media which were about twenty to thirty percent lower than the initial pressure drops across the AFS-4 and AFS-3 air filtration media. Thus, the power requirements for passing the air or gas streams being filtered through filters using the new air filtration media and the costs of operating such filters are significantly reduced.

The air filtration media of the present invention is a fibrous blanket, preferably, made up of flame attenuated glass fibers which are bonded together at their intersections with a binder. The blanket ranges in weight from about 2.5 to about 4.0 grams per square foot and the average diameter of the fibers ranges from about $3.0 \times 10^{-5}$ to about $4.1 \times 10^{-5}$ inches. The fibrous blankets of the present invention have average air filtration efficiencies ranging from at least 80% to about 95% and the initial pressure drop across the thickness of the blanket ranges from no greater than 0.15 inches of water and preferably no greater than 0.12 inches of water at the lower efficiency levels to no greater than 0.30 inches of water and preferably no greater than 0.25 inches of water at the higher efficiency levels. The air filtration media of the present invention can be used alone, or in combination with one or more additional layers or blankets of filtration media, as part of a multi-phase air filtration media.

In one embodiment of the new air filtration media, the fibrous blanket is made of fibers having an average fiber diameter between about $3.3 \times 10^{-5}$ and $4.1 \times 10^{-5}$ inches. The blanket weighs between about 2.5 and about 3.5 grams per square foot; is substantially uniform in density and thickness throughout; has an average air filtration efficiency of at least 80% and preferably about 85%; and an initial pressure drop across the blanket no greater than 0.15 inches of water and preferably, no greater than 0.12 inches of water. Preferably, the blanket ranges in thickness from about 0.08 to about 0.12 inches.

In another high efficiency embodiment of the new air filtration media, the fibrous blanket is made of fibers having an average fiber diameter between about $3.0 \times 10^{-5}$ and $3.7 \times 10^{-5}$ inches. The blanket weighs between about 3.0 and 4.0 grams per square foot; is substantially uniform in density and thickness throughout; has an average air filtration efficiency of at least 90% and preferably about 95%; and an initial pressure drop across the blanket no greater than 0.30 inches of water and preferably, no greater than 0.25 inches of water. Preferably, the blanket ranges in thickness from about 0.08 to about 0.12 inches.

DESCRIPTION OF THE PREFERRED EMBODIMENTS

Figure 1:
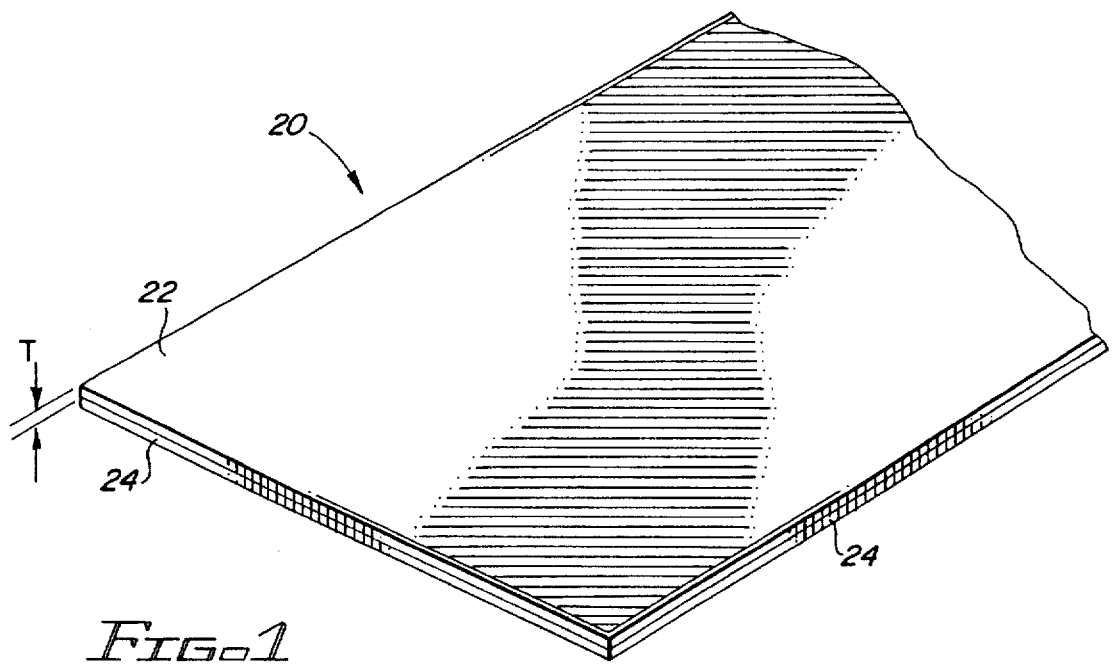
FIG. 1 is a schematic perspective of the high efficiency, light weight air filtration media of the present invention.

As shown in FIG. 1, the air filtration media 20 of the present invention comprises a thin fibrous blanket 22.

Preferably, the blanket is about 0.08 to about 0.12 inches thick; substantially uniform in density and thickness throughout; and essentially free of macroscopic voids which would permit portions of an air or gas stream to pass through the blanket essentially unfiltered. With its substantially uniform density and thickness, the blanket 22 provides consistent or substantially consistent filtration performance over its entire surface area.

The blanket 22 is formed of fibers which are bonded together at their points of intersection with a binder. The average diameter of the fibers forming the blanket ranges from $3.0 \times 10^{-5}$ to $4.1 \times 10^{-5}$ inches. Fibers having an average diameter less than $3.0 \times 10^{-5}$ inches are too short and fragile to provide the blanket with the integrity required for most applications. Fibers having an average diameter over $4.1 \times 10^{-5}$ inches are too large in diameter to provide the required average air filtration efficiencies at the low blanket weights of the air filtration media 20 of the present invention.

The preferred fibers for the blanket 22 are flame attenuated glass fibers. These fibers are formed by drawing continuous primary glass filaments from a conventional feeder or pot and introducing these continuous primary glass filaments into the high energy gaseous blast of a flame attenuation burner, e.g. a Selas burner, where the continuous filaments are reheated, attenuated and formed into fine diameter staple or finite length glass fibers of the desired diameter within the aforementioned diameter range. A binder is then sprayed onto the finite length fibers and the fibers are collected to form the blanket 22, e.g. on a moving chain, collection conveyor. Typically, the blanket 22 is collected on a permeable backing sheet 24 carried on the collection conveyor. The permeable backing sheet 24, when used, facilitates the handling of the blanket, increases the integrity of the blanket, and, as shown in FIG. 1, becomes part of the finished product. Preferably, the blanket 22, with or without a permeable backing sheet 24, is then passed between sear rolls which at least partially cure the binder in the blanket. The sear rolls are spaced apart a selected distance to set the thickness of the blanket 22.

While flame attenuated glass fibers are preferred, other fibers may be used to form the blanket 22, such as glass fibers produced on rotary fiberization processes and polymeric fibers. The fiber diameters set forth in this specification are measured by a micronaire flow resistance test.

The binder used to bond the fibers of the blanket 22 is typically a phenolic binder. However, undyed phenolic binders, when cured, give the blanket 22 a yellow or tan appearance. To give the blanket 22 a white appearance and to reduce volatile emissions during the manufacturing process, acrylic latex binders, ethyl vinyl acetate binders, and styrene butadiene binders can be used to bond the fibers of the blanket together. Preferably, the binder is between about 12% and about 17% by weight of the total weight of the blanket 22.

As discussed above, when used, the permeable backing sheet 24 increases the integrity of the air filtration media 20 by reinforcing the blanket 22, but adds little or nothing to the filtration efficiency or dirt holding capacity of the air filtration media. The backing sheet 24 is a permeable sheet, such as, but not limited to, a light weight (e.g. 0.4–0.5 oz. per square yard), non-woven, open mesh scrim of polyester, nylon, glass or similar materials.

The blankets 22 of the air filtration media of the present invention range is weight from about 2.5 to about 4.0 grams per square foot and have an initial pressure drop across their thickness "T" from, preferably, no greater than 0.12 inches of water at the lower weights and average air filtration efficiencies to, preferably, no greater than 0.30 inches of water at the higher weights and average air filtration efficiencies. The initial pressure drops across the blankets 22 are measured before any dust loading of the blanket. The average air filtration efficiencies of the blankets 22 of the air filtration media 20 of the present invention range from at least 80% for the lighter weight and coarser fiber blankets up to about 95% for the heavier weight and finer fiber blankets.

The efficiency ratings given to the blankets 22 of the air filtration media 20 of the present invention are based on the following testing procedure. An air stream, with 0.3 to 0.5 micron mineral oil droplets, is passed through a two foot square section of the blanket at a velocity of twenty-five feet per minute. The number of droplets in the air stream, upstream of the blanket 22, is compared to the number of droplets in the air stream, downstream of the blanket 22, to determine the efficiency. The initial efficiency rating for the blanket is the efficiency measured at the beginning of the test run with no dust loading.

During the testing procedure, dust particles are added to the blanket section by passing an air stream containing the dust particles through the blanket section at a velocity of twenty-five feet per minute. When the pressure drop across the blanket 22 reaches on inch of water, the blanket is considered plugged and the test is completed. The average air filtration efficiency rating for the blanket 22 is an average of the measured air filtration efficiencies of the blanket as measured when the pressure drop across the blanket reaches certain levels during the test. The efficiency measurements made to determine the average air filtration efficiency of the blanket 22 are made: at the beginning of the test, at the end of the test (when the pressure drop across the blanket is one inch of water), and when the dust loading of the blanket causes the pressure drops, across the blanket 22, to be at the following levels: 25%, 50% and 75% of the way between the initial pressure drop across the blanket and the final pressure drop across the blanket of one inch of water. This average efficiency rating is referred to in this specification as the "average air filtration efficiency". This efficiency measurement is based on the mechanical trapping of dust particles by the blanket 22 and is not based on efficiencies which can be obtained, with certain filtration media, by means of an electrostatic charge on the fibers of the filtration media attracting and capturing charged dust particles present in an air or gas stream or by applying tackifiers, such as oils, to the fibers of the blanket to which dust particles in the air or gas stream adhere. The "dust holding capacity" of a blanket is the weight of dust particles, in grams, that causes the two foot square section of blanket being tested to have a one inch of water pressure drop across its thickness.

The thicknesses of the blankets set forth in this specification are measured by placing a one foot square 630 gram weight on a one foot square section of blanket and measuring the thickness of the blanket when compressed by the weight.

In one high efficiency embodiment of the present invention, the fibrous blanket 22 is made of fibers (preferably flame attenuated glass fibers) having an average diameter between $3.3 \times 10^{-5}$ and $4.1 \times 10^{-5}$ inches. The blanket weighs between about 2.5 and about 3.5 grams per square foot; is substantially uniform in density and thickness throughout; and has an average air filtration efficiency of at least 80% and preferably, about 85%. The initial pressure drop across the thickness "T" of the blanket 22 is no greater than 0.15 inches of water and preferably, no greater than 0.12 inches of water. Preferably, the blanket 22 ranges in thickness from about 0.08 to about 0.12 inches and typically, has a dust holding capacity of about 10 to about 12 grams.

In the highest efficiency embodiment of the present invention, the fibrous blanket 22 is made of fibers (preferably flame attenuated glass fibers) having an average diameter between $3.0 \times 10^{-5}$ and $3.7 \times 10^{-5}$ inches. The blanket weighs between about 3.0 and 4.0 grams per square foot; is preferably substantially uniform in density and thickness throughout; and has an average air filtration efficiency of at least 90% and preferably, about 95%. The initial pressure drop across the thickness "T" of the blanket 22 is no greater than 0.30 inches of water and preferably, no greater than 0.25 inches of water. Preferably, the blanket 22 ranges in thickness from about 0.08 to about 0.12 inches and typically, has a dust holding capacity of about 10 to about 12 grams.

Figure 2:
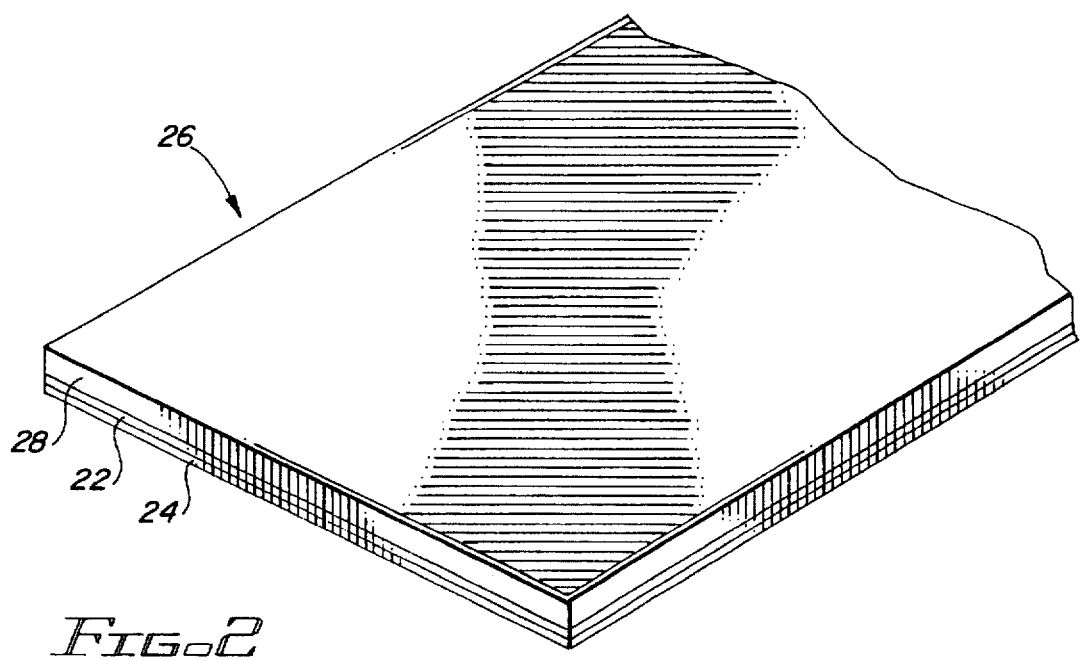
FIG. 2 is a schematic perspective of a dual phase air filtration media incorporating the high efficiency, light weight air filtration media of the present invention.

As discussed above, the blanket 22 can be used as an air or gas filtration media without the permeable backing sheet 24. However, typically, the permeable backing sheet 24 is bonded to the downstream surface of the blanket 22, as shown in FIG. 1, to reinforce the blanket 22 and give the blanket greater integrity. As shown in FIG. 2, the blanket 22 can also be used in dual-phase or other multi-phase air filtration media 26. Preferably, the upstream layer or blanket 28 of the filtration media 26 is bonded to the upstream surface of the blanket 22; made of coarser fibers than those of the blanket 22; and increases the dust holding capacity of the dual-phase or multi-phase air filtration media 26. Typically, the blanket 28 is made of glass, polymeric or other fibers normally used in fibrous filtration media.

While the air filtration media of the present invention is primarily intended for air filtration applications, the air filtration media of the present invention can also be used to filter various types of gases and gaseous mixtures.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A fibrous air filtration media, comprising: a blanket of glass fibers bonded together at their points of intersection by a binder; said blanket having a weight between about 2.5 and about 4.0 grams per square foot and having a thickness between about 0.08 and 0.12 inches; said glass fibers having an average fiber diameter within a range from $3.0 \times 10^{-5}$ to $4.1 \times 10^{-5}$ inches; and said blanket having an average air filtration efficiency of at least 80% and an initial pressure drop across its thickness no greater than 0.30 inches of water.

2. The fibrous air filtration media according to claim 1, wherein: said blanket has an initial pressure drop across its thickness no greater than 0.15 inches of water.

3. The fibrous air filtration media according to claim 1, wherein: said blanket has an initial pressure drop across its thickness no greater than about 0.12 inches of water and a dust holding capacity of at least 10 grams.

4. The fibrous air filtration media according to claim 1, wherein: said blanket has an average air filtration efficiency of about 85% and an initial pressure drop across its thickness no greater than 0.15 inches of water.

5. The fibrous air filtration media according to claim 4, wherein: said blanket has an initial pressure drop across its thickness no greater than about 0.12 inches of water and a dust holding capacity of at least 10 grams.

6. The fibrous air filtration media according to claim 1, wherein: said blanket has an average air filtration efficiency of at least 90%.

7. The fibrous air filtration media according to claim 6, wherein: said blanket has an initial pressure drop across its thickness no greater than 0.25 inches of water and a dust holding capacity of at least 10 grams.

8. The fibrous air filtration media according to claim 1, wherein: said blanket has an average air filtration efficiency of about 95%.

9. The fibrous air filtration media according to claim 8, wherein: said blanket has an initial pressure drop across its thickness no greater than 0.25 inches of water and a dust holding capacity of at least 10 grams.

10. The fibrous air filtration media according to claim 1, including: a second fibrous blanket of air filtration media bonded to a major surface of said blanket.

11. A fibrous air filtration media, comprising: a blanket of glass fibers bonded together at their points of intersection by a binder; said blanket having a weight between about 2.5 and about 3.5 grams per square foot and a thickness between about 0.08 and about 0.12 inches; said glass fibers having an average fiber diameter in a range from $3.3 \times 10^{-5}$ to $4.1 \times 10^{-5}$ inches; said blanket having an average air filtration efficiency of at least 80%; an initial pressure drop across its thickness no greater than 0.15 inches of water; and a dust holding capacity of at least 10 grams.

12. The fibrous air filtration media according to claim 11, wherein: said blanket has an initial pressure drop across its thickness no greater than 0.12 inches of water.

13. The fibrous air filtration media according to claim 11, wherein: said blanket has an average air filtration efficiency of about 85%.

14. The fibrous air filtration media according to claim 13, wherein: said blanket has an initial pressure drop across its thickness no greater than 0.12 inches of water.

15. The fibrous air filtration media according to claim 14, wherein: said glass fibers are flame attenuated glass fibers.

16. The fibrous air filtration media according to claim 11, including: a second fibrous blanket of air filtration media bonded to a major surface of said blanket.

17. A fibrous air filtration media, comprising: a blanket of glass fibers bonded together at their points of intersection by a binder; said blanket having a weight between about 3.0 and about 4.0 grams per square foot and a thickness between about 0.08 and about 0.12 inches; said glass fibers having an average fiber diameter within a range from $3.0 \times 10^{-5}$ to $3.7 \times 10^{-5}$ inches; said blanket having an average air filtration efficiency of at least 90%; an initial pressure drop across its thickness no greater than 0.30 inches of water; and a dust holding capacity of at least 10 grams.

18. The fibrous air filtration media according to claim 17, wherein: said blanket has an initial pressure drop across its thickness no greater than 0.25 inches of water.

19. The fibrous air filtration media according to claim 17, wherein: said blanket has an average air filtration efficiency of about 95%.

20. The fibrous air filtration media according to claim 19, wherein: said blanket has an initial pressure drop across its thickness no greater than 0.25 inches of water.

21. The fibrous air filtration media according to claim 20, wherein: said glass fibers are flame attenuated glass fibers.

22. The fibrous air filtration media according to claim 17, wherein: said glass fibers are flame attenuated glass fibers.

23. The fibrous air filtration media according to claim 17, including: a second fibrous blanket of air filtration media bonded to a major surface of said blanket.

* * * * *